Jan. 27, 1925.

E. BESAG 1,524,285

METHOD OF AND MEANS FOR MEASURING ELECTRIC CURRENT

Filed July 30, 1914

Patented Jan. 27, 1925.

1,524,285

UNITED STATES PATENT OFFICE.

ERNST BESAG, OF FRANKFORT-ON-THE-MAIN, GERMANY.

METHOD OF AND MEANS FOR MEASURING ELECTRIC CURRENT.

Application filed July 30, 1914. Serial No. 854,137.

(GRANTED UNDER THE PROVISIONS OF THE ACT OF MARCH 3, 1921, 41 STAT. L., 1313.)

*To all whom it may concern:*

Be it known that I, ERNST BESAG, a subject of the German Emperor, and a resident of Frankfort-on-the-Main, Germany, have invented certain new and useful Improvements in Methods of and Means for Measuring Electric Current, of which the following is a specification.

The measurement of continuous current, when it is not desired to connect instruments directly in the line, has heretofore been effected by using a shunt to which the measuring instrument is connected. This arrangement is attended with drawbacks which become more particularly noticeable in case of heavy currents and high pressures. In the first place, the shunt consumes an excessive amount of energy, and the wires to the instrument must have a resistance fixed during the calibration of the instrument. Moreover, the wires are at the full potential relatively to earth which in case of railway installations at 500-800 volts, necessitates very good insulation and disposition.

These drawbacks are obviated in a simple manner according to this invention, which employs an arrangement merely requiring the presence of a source of alternating current.

The main feature of the invention resides in the continuous current to be measured being caused to act on the flux induced by an alternating current circuit and the resulting modification of the alternating current circuit then measured.

As the tension of the alternating current circuit can be made as low as desired, the resistance of the wires does not much matter, and the current consumption is very small, the present invention avoids all the drawbacks mentioned.

Figure 1:
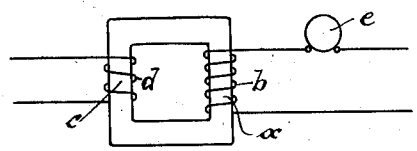
Fig. 1 illustrates the simplest form of an arrangement for measuring continuous current by meanse of alternating current.
Figure 2:
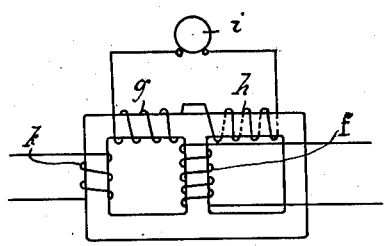
Fig. 2 illustrates a modification of such an arrangement in which the measurement is effected in a circuit induced by the alternating current winding.

In carrying out the invention there may be used, as shown for instance in Figure 1, an iron core, on the branch $a$ of which is placed an alternating current winding $b$, and on the branch $c$ a continuous current winding $d$. According to the strength of the continuous current passing through $d$, a change is produced in the alternating current circuit, which is perceptible on the measuring instrument $e$. The arrangement may be such that the measurement is effected in a circuit inductively connected with the alternating current winding, as shown in Figure 2. If the winding $f$ is traversed by alternating current, it will induce currents in the windings $g$ and $h$. As however these currents flow in opposite directions, they neutralise each other, and the instrument $i$ will not indicate any current. If, however, continuous current is sent through the winding $k$, the change in the induction thus produced, will affect $g$, and disturb the equilibrium between the windings $g$ and $h$, the measuring instrument being influenced to an extent corresponding to the magnitude of the continuous current.

It will be understood that the invention is not limited to the particular details which have been described for the sake of illustration, but include details which fall within the scope of the appended claims.

Having thus described the invention what is claimed as new and desired to be secured by Letters Patent is:

1. A method of measuring continuous current which comprises causing the continuous current to modify the flux induced by an alternating current flowing in an alternating current circuit, and measuring the effect of the flux changes produced by the variations in the value of the continuous current.

2. A method of measuring continuous current which consists in causing the continuous current to modify the flux induced by an alternating current flowing in an alternating current circuit, and measuring the resulting current change in the alternating current circuit.

3. In a device of the class described, the combination of a direct current circuit, an alternating current circuit inductively related to the direct current circuit, and an instrument responsive to the flux changes in the alternating current circuit for measuring the value of the direct current flowing in the direct current circuit.

4. Means for measuring continuous current comprising an iron core having a direct current winding and an alternating current winding, and a measuring instrument associated with the alternating current winding.

5. Means for measuring continuous current comprising an iron core having a direct current winding and an alternating current winding, and a measuring means connected to the alternating current winding and adapted to measure the current flowing therein.

6. A device for measuring continuous current comprising an iron core having a direct current winding and an alternating current winding, and a measuring means inductively connected to the alternating current winding.

7. A device for measuring continuous current comprising an iron core having three parallel limbs, a direct current winding on one of said limbs, an alternating current winding on another of said limbs, and means for measuring the current flowing in the alternating current winding.

In testimony whereof I affix my signature in presence of two witnesses.

Dated this 22 day of July 1914.

ERNST BESAG.

Witnesses:
ERWIN DIPPEL,
JOSEPH CONRADI.